(12) United States Patent
Ooishi et al.

(10) Patent No.: US 8,020,383 B2
(45) Date of Patent: Sep. 20, 2011

(54) STEAM VALVE AND GENERATOR SET

(75) Inventors: Tsutomu Ooishi, Yokohama (JP);
Tomoo Oofuji, Yokohama (JP); Hideo Hosaka, Kawasaki (JP); Yasunori Iwai, Yokohama (JP); Hiroshi Saeki, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 427 days.

(21) Appl. No.: 12/244,462

(22) Filed: Oct. 2, 2008

(65) Prior Publication Data
US 2009/0101859 A1    Apr. 23, 2009

(30) Foreign Application Priority Data
Oct. 3, 2007    (JP) .................... 2007-259815

(51) Int. Cl.
*F01K 1/00*    (2006.01)
*F16K 1/00*    (2006.01)
(52) U.S. Cl. ............. 60/670; 137/613; 137/630.14; 137/630.15
(58) Field of Classification Search ............. 60/645, 60/670; 137/614.19, 614.18, 614.17, 614.16, 137/637, 637.2, 613, 630, 630.14, 630.15
See application file for complete search history.

(56) References Cited

U.S. PATENT DOCUMENTS

| | | | | |
|---|---|---|---|---|
| 3,809,126 A | * | 5/1974 | Oberle | 137/630.14 |
| 4,414,652 A | * | 11/1983 | Crist | 367/93 |
| 4,481,776 A | * | 11/1984 | Araki et al. | 60/660 |
| 6,070,605 A | | 6/2000 | Steenburgh | |
| 6,655,409 B1 | * | 12/2003 | Steenburgh et al. | 137/614.19 |
| 7,481,058 B2 | * | 1/2009 | Fukuda et al. | 60/645 |

OTHER PUBLICATIONS

Toru Sema (editor), "Review of Thermal Power Generation", Institute of Electrical Engineers, First Edition, Oct. 25, 2002, p. 143, Figs. 6.38 and 6.39.

* cited by examiner

*Primary Examiner* — Hoang M Nguyen
(74) *Attorney, Agent, or Firm* — Foley & Lardner LLP

(57) ABSTRACT

A steam valve 1 includes: a valve seat 9 being accommodated in a steam flow path of a casing 2 provided with a steam inlet pipe 14 and a steam outlet pipe 15; and a valve body 22, 27 capable of contacting the valve seat 9, the valve body 22, 27 being accommodated in the steam flow path of the casing 2. An expansion part 10 that smoothly projects toward an inside of the steam outlet pipe 15 is disposed at a downstream side on a contact surface of the valve seat 9.

11 Claims, 14 Drawing Sheets

TO STEAM OUTLET PIPE 15

STEAM VALVE AND GENERATOR SET

CROSS REFERENCE TO RELATED APPLICATIONS

This application is based upon and claims the benefit of priority from the prior Japanese Patent Application No. 2007-259815 filed on Oct. 3, 2007, the entire contents of which are incorporated herein by reference.

FIELD OF THE INVENTION

The present invention relates to a steam valve that controls and shuts off an amount of a steam flowing from a boiler into a steam turbine, and a generator set using this steam valve.

BACKGROUND ART

Steam valves are generally installed on an upstream side of a steam turbine, in order to control/shut off a flow rate of a steam. Steam valves installed on an upstream side of a high pressure turbine are referred to as a main-steam stop valve and a steam regulating valve, which are serially disposed. Steam valves installed on an upstream side of an intermediate pressure turbine are referred to as a combination reheat steam valve (hereinafter also referred to as "reheat steam valve") having a casing in which an intercept valve and a reheat steam stop valve are combined (see, for example, Review of Thermal Power Generation, edited by Toru SEMA, Institute of Electrical Engineers, First Edition published on Oct. 25, 2002 (page 143, FIGS. 6.38 and 6.39)).

As shown in FIG. 16, supplied through a steam inlet pipe 14 to such a reheat steam valve 1 is a steam which has been overheated by a reheater of a boiler disposed on an upstream side. The steam having passed through the reheat steam valve 1 is introduced to an intermediate pressure turbine disposed on a downstream side through a steam outlet pipe 15.

As shown in FIG. 16, the reheat steam valve 1 includes: an intercept valve 20 that is driven from above to move in an up and down direction; a reheat steam stop valve 25 connected to a lower side of the intercept valve 20, the reheat steam stop valve 25 being driven from below to move in the up and down direction; and a cylindrical strainer 6 that is disposed to surround the intercept valve 20 and the reheat steam stop valve 25, the strainer 6 preventing foreign matters from the upstream boiler from being mixed into the downstream intermediate pressure turbine. The strainer 6 is formed of a porous plate.

The intercept valve 20 has: a valve rod 21 that is driven from above to move in the up and down direction; and a valve body 22 annularly disposed on the valve rod 21, the valve body 22 having a recess 22a in a lower surface thereof.

The reheat steam stop valve 25 has: a valve rod 26 that is driven from below to move in the up and down direction; and a valve body 27 disposed on the valve rod 26 to project therefrom in a circumferentially outer direction, the valve body 27 being capable of being received in the recess 22a of the valve body 22 of the intercept valve 20.

Disposed below the intercept valve 20 and the reheat steam stop valve 25 is a valve seat 9 capable of contacting the valve body 22 of the intercept valve 20 and the valve body 27 of the reheat steam stop valve 25. When the intercept valve 20, the reheat steam stop valve 25, or both, are in press-contact with the valve seat 9, a steam flow path can be closed.

As shown in FIG. 17, since the steam outlet pipe 15, which is bent at an acute angle, is disposed on the downstream side of the reheat steam valve 1, a primary flow of the steam generates a secondary flow. Because of another steam flow flowing into a part of the secondary flow where a speed thereof is slow, intensive secondary flows overlap each other in a steam valve outlet flow, which finally invites an increase in damage in pressure loss.

More specifically, in FIG. 17, after a steam primary flow F having flown into the reheat steam valve 1 passes through the strainer 6, the steam primary flow F passes through a gap between the valve body 22 of the intercept valve 20 and the valve body 27 of the reheat steam stop valve 25, and the valve seat 9. Thereafter, the steam reaches an inside of the steam outlet pipe 15. At this time, since a space into which the steam flows is abruptly widened, a part of a flow F3 becomes a secondary flow swirl, causing a loss.

In addition, another part of flow F1, which cannot follow an abrupt turning of the steam when the steam goes out to a steam outlet flow path 32, is pressed onto a lower portion of the steam outlet pipe 15, and is then discharged as a primary flow. On the other hand, in an upper portion of the steam outlet pipe 15, there is generated a secondary flow F2 which is then discharged while forming a swirl in the upper portion of the steam outlet pipe 15.

At this time, the primary flow F1 in the lower portion of the steam outlet pipe 15 and the secondary flow F2 in the upper portion of the steam outlet pipe 15 would strongly collide with each other, to thereby generate a serious pressure loss. FIG. 18 is a view showing a flow of a steam when viewed from the outlet side (viewed along an arrow X in FIG. 17). As shown in FIG. 18, the primary flow F1 flows through a range S and is discharged, while the secondary flow F2 is discharged while turning in a direction of an arrow A.

In addition, a steam passing through a surface of the strainer 6 passes through holes in the strainer 6. Thus, an axial component of velocity of a cylinder of the strainer 6 is induced to generate a strong secondary flow.

In general, it is said that, when a pressure loss of a steam valve is reduced by 1%, a heat rate of an overall steam turbine is improved by 0.1% (see, Turbo Machine, Vol. 30, No. 7), and thus a further reduction of pressure loss in the steam valve is an important object that should not be unnoticed.

DISCLOSURE OF THE INVENTION

The present invention has been made in view of the above circumstances. It is an object of the present invention to provide a steam valve which controls/shuts off an amount of a steam flowing from a boiler to a steam turbine, the steam valve being capable of significantly reducing a pressure loss. Another object of the present invention is to provide a generator set using such a steam valve.

The present invention is a steam valve comprising: a valve seat being accommodated in a steam flow path of a casing provided with a steam inlet pipe and a steam outlet pipe; a valve body capable of contacting the valve seat, the valve body being accommodated in the steam flow path of the casing; and an expansion part that smoothly projects from the valve seat toward the steam outlet pipe, disposed at a downstream side on a contact surface of the valve seat.

The present invention is a generator set comprising: a steam valve having a valve seat being accommodated in a steam flow path of a casing provided with a steam inlet pipe and a steam outlet pipe; a valve body capable of contacting the valve seat, the valve body being accommodated in the steam flow path of the casing; and an expansion part that smoothly projects from the valve seat toward the steam outlet pipe, disposed at a downstream side on a contact surface of the valve seat.

The present invention is a generator set comprising: a boiler configured to generate a steam; a steam valve to which the steam from the boiler is introduced through a steam inlet pipe; and a steam turbine to which the steam having passed through the steam valve is introduced through a steam outlet pipe, the steam turbine being configured to generate an electric power by using the steam; wherein: the steam valve comprises: a control valve being accommodated in a casing, the control valve is driven from one side and is capable of contacting a valve seat; a stop valve being accommodated in the casing and disposed on the other side of the control valve, the stop valve being driven from the other side and being capable of contacting the valve seat; and an expansion part that smoothly projects from the valve seat toward the steam outlet pipe of the casing, disposed at a downstream side on a contact surface of the valve seat.

According to the present invention, since the expansion part projecting toward the inside of the steam outlet flow path is disposed on the downstream side of the valve seat, a flow of the steam, which has passed through the valve seat can be controlled, whereby a pressure loss can be significantly reduced.

EMBODIMENTS OF CARRYING OUT THE INVENTION

First Embodiment

Figure 1:
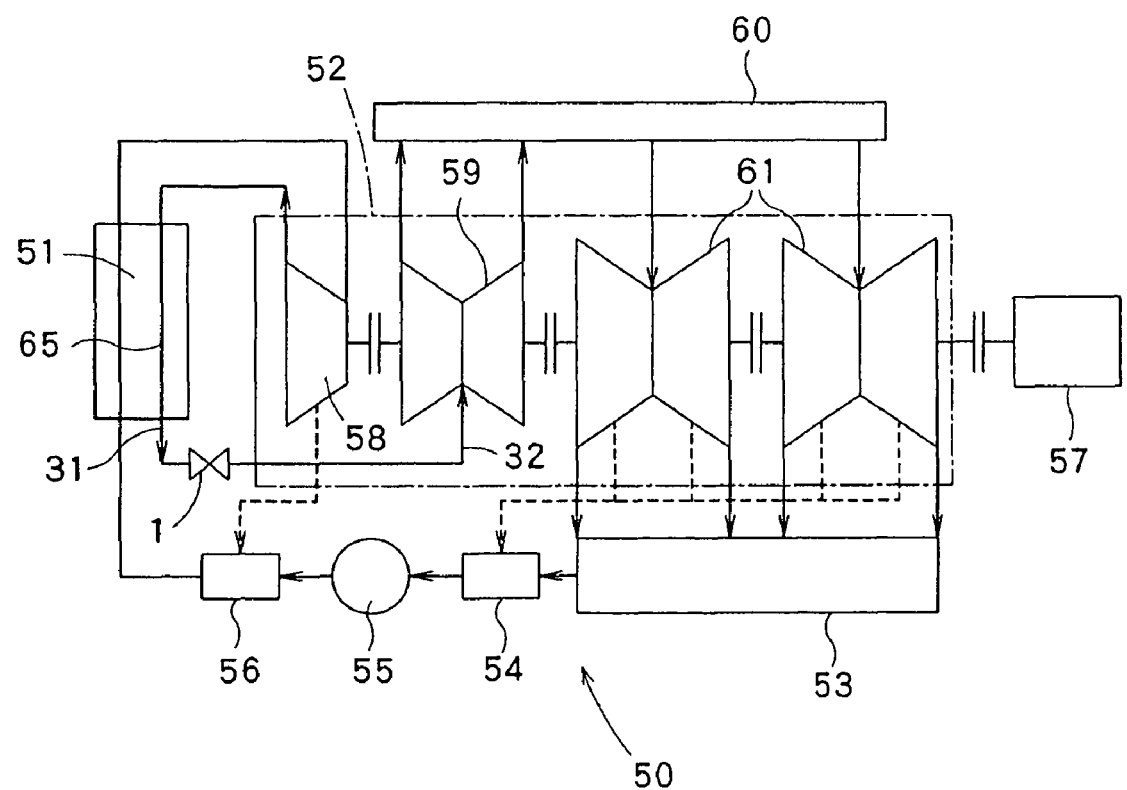
FIG. 1 is a schematic view of a generator set in a first embodiment of the present invention.
Figure 2:
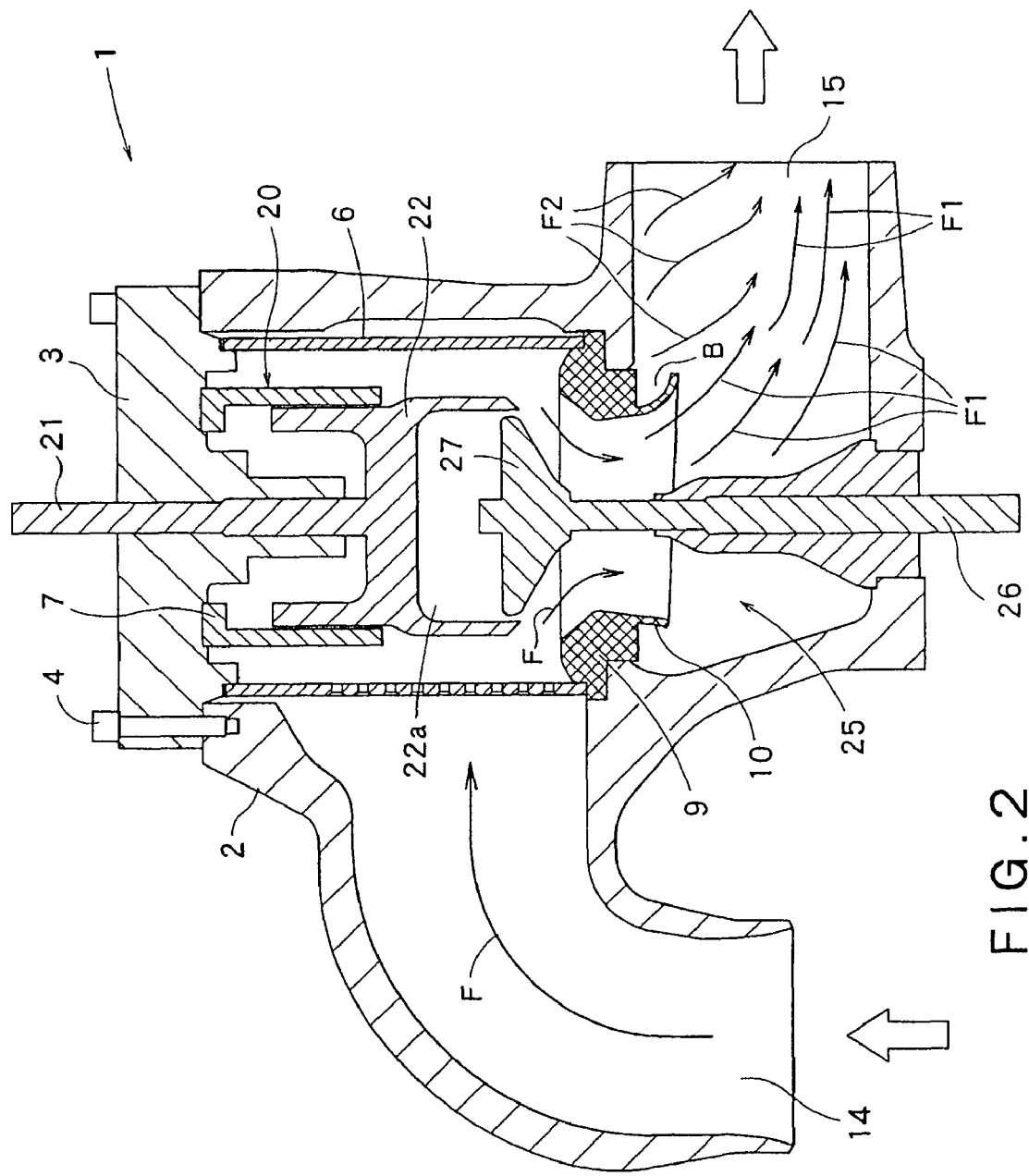
FIG. 2 is a longitudinal sectional view of a steam valve in the first embodiment of the present invention.
Figure 3:
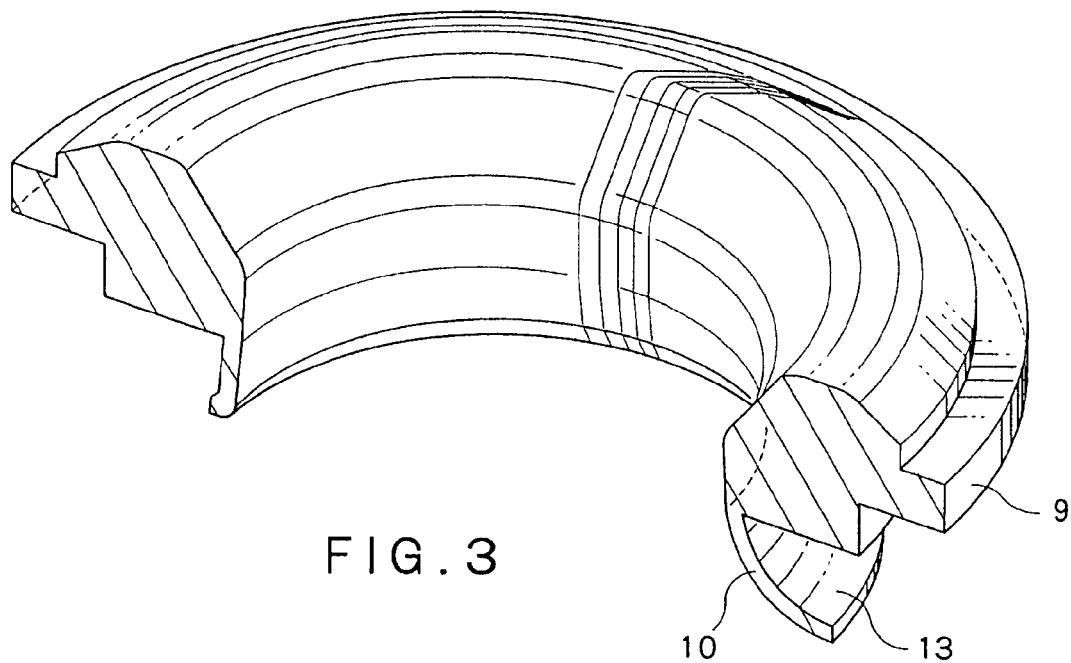
FIG. 3 is a perspective view of the steam valve in the first embodiment of the present invention.

A first embodiment of a steam valve and a generator set provided with the steam valve is described below with reference to the drawings. FIGS. 1 to 3 are views showing the first embodiment of the present invention.

As shown in FIG. 1, a generator set includes: a boiler 51 configured to generate a steam by utilizing a heat caused by combustion of a fossil fuel; a steam turbine 52 configured to be rotated by using the steam discharged from the boiler 51; a condenser 53 configured to collect the steam that has been used by the steam turbine 52; a low-pressure feed heater 54 configured to heat a water supplied from the condenser 53; a feed pump 55 configured to increase a pressure of the water heated by the low-pressure feed heater 54; a high-pressure feed heater 56 configured to heat the water from the feed pump 55; and a generator 57 connected to the steam turbine 52.

As shown in FIG. 1, the steam turbine 52 has: a high pressure turbine 58 to which a main steam from the boiler 51 is introduced; an intermediate pressure turbine to which a reheated steam, which has been discharged from the high pressure turbine 58 and is then reheated by a reheater 65 in the boiler 51, is introduced; and a low pressure turbine 61 to which the reheated steam discharged from the intermediate pressure turbine 59 is introduced through a crossover pipe 60.

As shown in FIG. 1, between a steam inlet pipe 31 serving as a flow path for introducing the steam from the reheater 65 in the boiler 51, and a steam outlet pipe 32 serving as a flow path for introducing the steam to the intermediate pressure turbine 59, there is disposed a reheat steam valve 1 (CRV).

As shown in FIG. 2, the reheat steam valve 1 has: a casing 2 provided with a steam inlet pipe 14 and a steam outlet pipe 15; an intercept valve (control valve) 20 accommodated in the casing 2, the intercept valve 20 being configured to be driven from an upper (one) side to move in an up and down direction; a reheat steam stop valve 25 connected to a lower (the other) side of the intercept valve 20, the reheat steam stop valve 25 being configured to be driven from a lower side to move in the up and down direction; and a cylindrical strainer 6 disposed to surround the intercept valve 20 and the reheat steam stop valve 25, the strainer 6 being configured to prevent foreign matters from the upstream boiler 51 from being mixed into the downstream intermediate pressure turbine 59. The strainer 6 is formed of a porous plate, and has a rectifying function for rectifying a flow of the steam.

As shown in FIG. 2, the intercept valve 20 has: a valve rod 21 configured to be driven from the upper side to move in the up and down direction; and a valve body 22 annularly disposed on an end of the valve rod 21, the valve body 22 being provided with a recess 22a in a lower surface thereof. Disposed on an outer periphery of the valve body 22 of the intercept valve 20 is a cylindrical valve body guide 7 that guides the valve body 22 of the intercept valve 20.

As shown in FIG. 2, the reheat steam stop valve 25 has: a valve rod 26 configured to be driven from the lower side to move in the up and down direction; and a valve body 27 disposed on an end of the valve rod 26. The valve body 27 outwardly projects from a periphery of the valve rod 26, and is positioned such that the valve body 27 can move into and out from the recess 22a of the valve body 22 of the intercept valve 20.

As shown in FIG. 2, at a position opposed to the valve bodies 22 and 27 of the intercept valve 20 and the reheat steam stop valve 25, there is disposed a valve seat 9 of a hollow annular shape to form a steam flow path. When the intercept valve 20 and the reheat steam stop valve 25 are moved downward, the valve seat 9 is adapted to contact the intercept valve 20 and the reheat steam stop valve 25. When the intercept valve 20, the reheat steam stop valve 25, or both, are in press-contact with the valve seat 9, the steam flow path is closed.

The reheat steam stop valve 25 functions as a safety valve that immediately shuts off a steam flowing into the intermediate pressure turbine 59 in an emergency. On the other hand, the intercept valve 20 has a steam amount adjusting function for adjusting an amount of a steam flowing into the intermediate pressure turbine 59.

Disposed above the valve rod 21 of the intercept valve 20 is an intercept valve driving apparatus (not shown) that hydraulically drives the valve rod 21 of the intercept valve 20 to move in the up and down direction. Disposed below the valve rod 26 of the reheat steam stop valve 25 is a reheat-steam stop valve driving apparatus (not shown) that hydraulically drives the valve rod 26 of the reheat steam stop valve 25 to move in the up and down direction.

As shown in FIGS. 2 and 3, integrally formed with the valve seat 9 on a lower surface thereof is an expansion part 10 which projects toward an inside of the outlet steam pipe 15. The expansion part 10 is curvilinearly formed from the valve seat 9 such that an inner diameter of an opening of the expansion part 10 is smoothly expanded from an inner diameter of an outlet part of the valve seat 9 so as to form a hollow part 13 between the expansion part 10 and the lower surface of the valve seat 9. Furthermore, the expansion part 10 is disposed at a downstream side on a contact surface of the valve seat 9. Here, the downstream side on the contact surface of the valve seat 9 means a side of the outlet steam pipe 15 in a plane perpendicular to the valve rods 21 and 26 (Note that the valve rods 21 and 26 are perpendicular to a ring of the valve seat 9). In other words, when seen in a direction of the valve rods 21 and 26, the expansion part 10 is asymmetrically disposed, mainly at a side of the outlet steam pipe 15.

As shown in FIG. 2, an upper lid 3 that covers the casing 2 from above is connected to an upper part of the casing 2 by means of a fastening bolt 4. Due to the upper lid 3 connected to the casing 2 by means of the fastening bolt 4, a steam flowing through the casing 2 can be prevented from leaking outside.

Next, an operation of this embodiment as structured above is described.

An overheated steam is made to flow from the reheater 65 of the boiler 51, which is positioned on the upstream side of the reheat steam valve 1, into the reheat steam valve 1 through the steam inlet flow path 31 (see, FIG. 1).

Then, after a flow rate of the overheated steam has been adjusted by the reheat steam valve 1, the overheated steam is made to flow to the intermediate pressure turbine 59 through the steam outlet pipe 32 (see, FIG. 1).

To be specific, by adjusting a gap between the intercept valve 20 and the valve seat 9, the steam can be made to flow into the downstream intermediate pressure turbine 59, while the flow rate of the steam being adjusted (see, FIG. 2).

In FIG. 2, it is possible to stop the flow of the steam by bringing the reheat steam stop valve 25 into contact with the valve seat 9 so as to close the steam flow path.

According to this embodiment, when the steam flows through the reheat steam valve 1, the steam moves along the expansion part 10 that is curvilinearly formed such that the expansion part 10 is smoothly expanded from the lower surface of the valve seat 9. Owing to this expansion part 10 that serves as a steam guide, a primary flow F1 of the steam can be smoothly introduced in a direction along which the steam outlet pipe 15 is extended, without the primary flow F1 of the steam being pressed onto a lower side of the steam outlet flow path 32. In addition, a secondary flow F2 generated in the upper part of the steam outlet pipe 15 is discharged without severely colliding with the primary flow of the steam. Therefore, the flow of the steam, which has passed through the valve seat 9, can be controlled, whereby a pressure loss can be significantly reduced.

Further, since the respective reheat steam stop valve 25 and the intercept valve 20 have the independent effects and functions, the respective functions can be reliably fulfilled in a rated operation, a partial load operation, and an emergency. Furthermore, since the combination structure of the reheat steam stop valve 25 and the intercept valve 20 is simple, not only a manufacturing operation but also an assembling and disassembling operation can be facilitated. Moreover, since the intercept valve 20 and the reheat steam step valve 25 are integrally formed with each other, the reheat steam valve 1 can be made compact.

Second Embodiment

Next, a second embodiment of the present invention is described with reference to FIG. 4. In the second embodiment shown in FIG. 2, a reinforcement rib 12, which fixes an expansion part 10 to a valve seat 9 for reinforcement, is disposed in a hollow part 13 between the expansion part 10 and the valve seat 9. Other structures of the second embodiment are substantially the same as those of the first embodiment shown in FIGS. 1 to 3.

Figure 4:
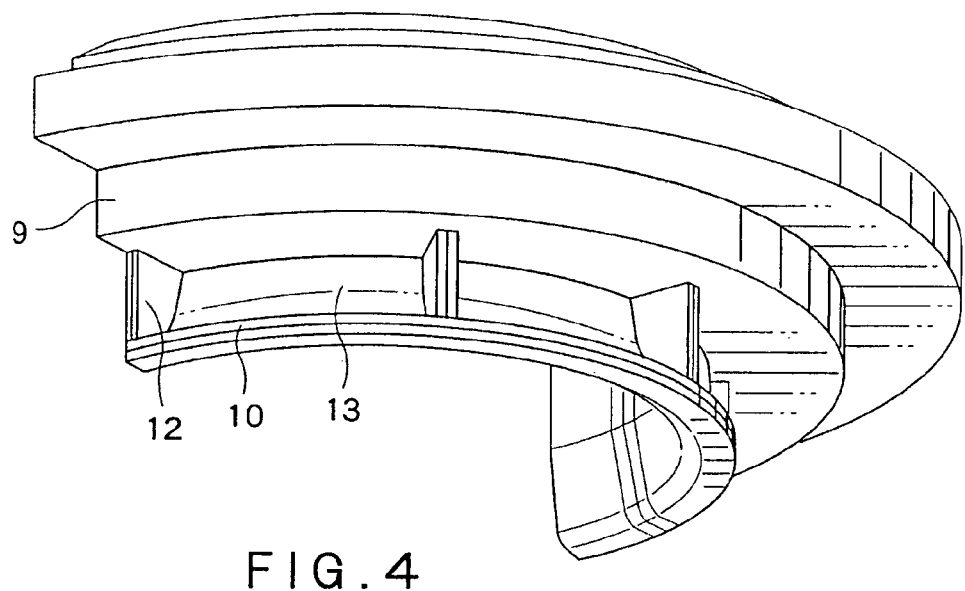
FIG. 4 is a perspective view of a steam valve in a second embodiment of the present invention.

In the second embodiment shown in FIG. 4, the same parts as those of the first embodiment shown in FIGS. 1 to 3 are indicated by the same reference numbers, and a detailed description thereof is omitted.

As shown in FIG. 4, since the reinforcement rib 12, which fixes the expansion part 10 to the valve seat 9 for reinforcement, is disposed in the hollow part 13 formed between the expansion part 10 and a lower surface of the valve seat 9, the fixing strength of the expansion part 10 to the valve seat 9 can be improved.

Third Embodiment

Next, a third embodiment of the present invention is described with reference to FIG. 5. In the third embodiment shown in FIG. 5, an expansion part 10 does not curvilinearly project from a valve seat 9 such that a hollow part 13 is formed between the expansion part 10 and the valve seat 9, but extends from the valve seat 9 toward a steam outlet pipe 15 without forming a gap. Other structures of the third embodiment are substantially the same as those of the first embodiment shown in FIGS. 1 to 3.

Figure 5:
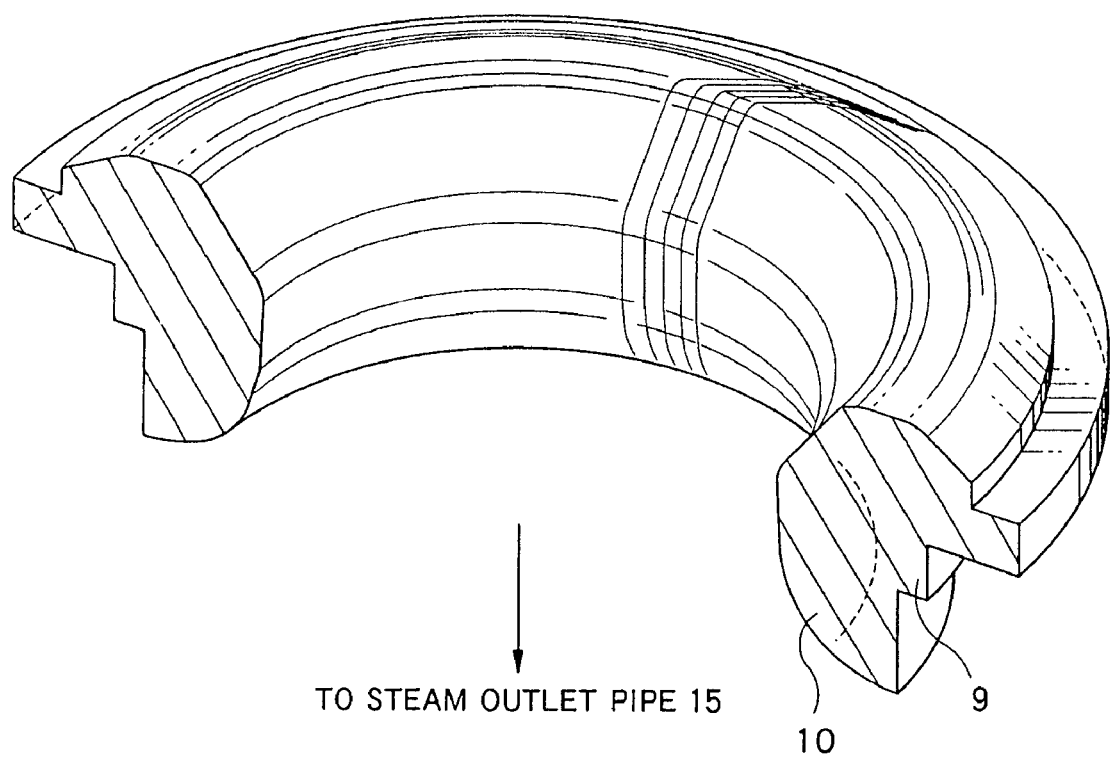
FIG. 5 is a perspective view of a steam valve in a third embodiment of the present invention.

In the third embodiment shown in FIG. 5, the same parts as those of the first embodiment shown in FIGS. 1 to 3 are indicated by the same reference numbers, and a detailed description thereof is omitted.

As shown in FIG. 5, the expansion part 10 extends from the valve seat 9 toward the steam outlet pipe 15 without forming a gap on a lower side. Namely, the expansion part 10 is not structured as in the first embodiment (see, FIGS. 2 and 3) in which an outer peripheral portion of the expansion part 10 is cut out to form the hollow part 13, but is structured to continuously extend downward from the valve seat 9, without the outer peripheral portion of the expansion part 10 being cut out. Thus, the fixing strength of the expansion part 10 to the valve seat 9 can be improved.

Fourth Embodiment

Next, a fourth embodiment of the present invention is described with reference to FIG. 6. In the fourth embodiment shown in FIG. 6, an expansion part 10 is not integrally formed with a valve seat 9, but is formed separately from the valve seat 9, whereby the expansion part 10 is attachable to and detachable from the valve seat 9. Other structures of the fourth embodiment are substantially the same as those of the first embodiment shown in FIGS. 1 to 3.

Figure 6:
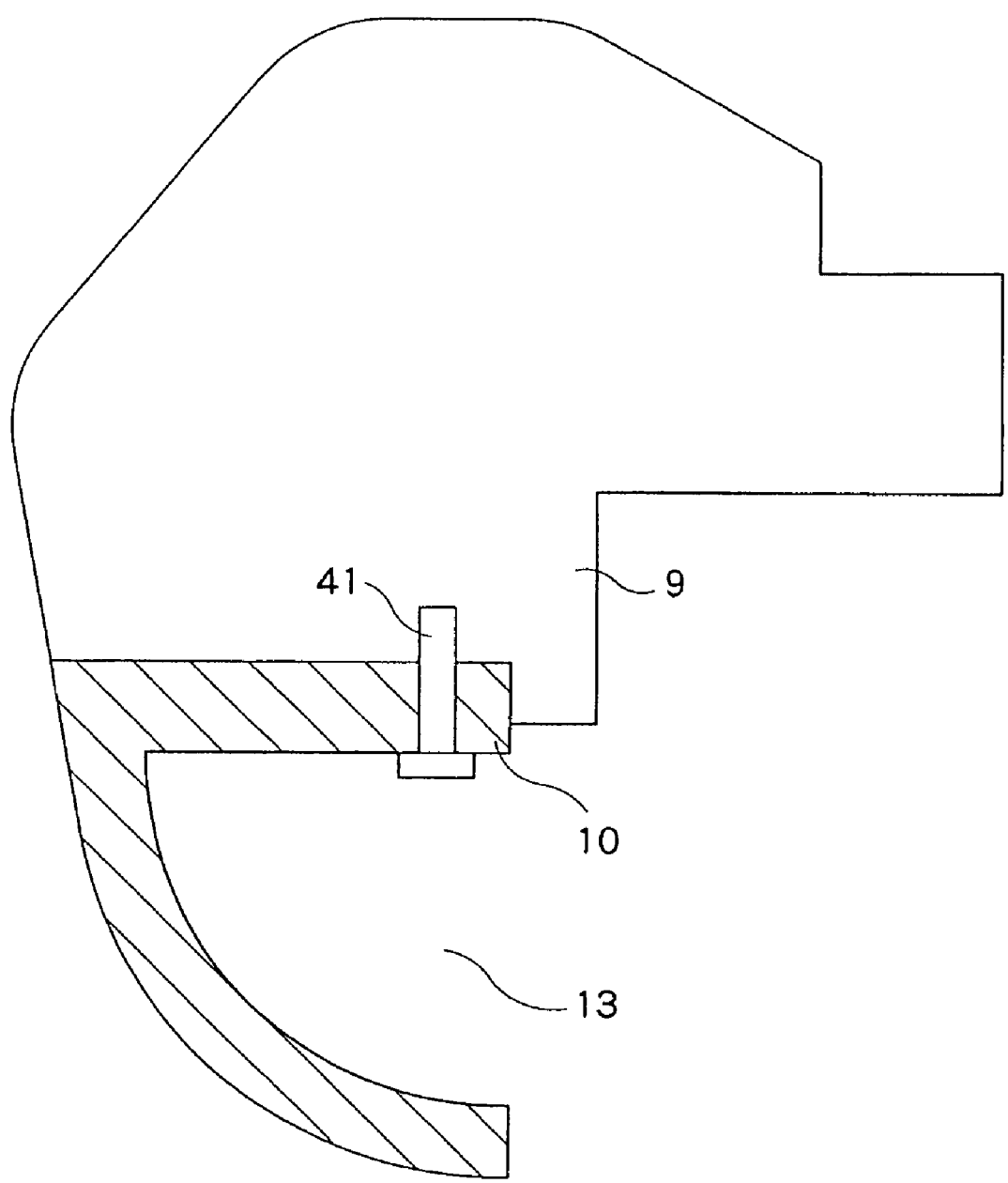
FIG. 6 is a longitudinal sectional view of a valve seat and an expansion part of a steam valve in a fourth embodiment of the present invention.

In the fourth embodiment shown in FIG. 6, the same parts as those of the first embodiment shown in FIGS. 1 to 3 are indicated by the same reference numbers, and a detailed description thereof is omitted.

As shown in FIG. 6, the expansion part 10 separate from the valve seat 9 is attached to the valve seat 9 by a fastening member 41 such as a bolt, whereby the expansion part 10 is attachable to and detachable from the valve seat 9. Since the expansion part 10 is formed separately from the valve seat 9, a manufacturing cost can be lowered.

Fifth Embodiment

Next, a fifth embodiment of the present invention is described with reference to FIGS. 7 and 8. In the fifth embodiment shown in FIGS. 7 and 8, a valve seat 9 has a flat surface 9a on a position that is more downstream than a contact surface between the valve seat 9 and the valve bodies 22, 27 in a steam flow path, while an expansion part 10 has a flat surface 10a that is continuous from the flat surface 9a of the valve seat 9 in the steam flow path in a steam outlet pipe 15. When a sum of a length $L_9$ of the flat surface 9a of the valve seat 9 in an up and down direction (a predetermined direction directed from one side toward the other side) and a length $L_{10}$ of the flat surface 10a of the expansion part 10 in the up and down direction is L, and a nominal diameter of a reheat steam valve 25 (a radius of a contact surface that is defined when the reheat steam stop valve 25 is in contact with the valve seat 9) is D, a condition $0<L/D\leqq0.25$ is satisfied. Other structures of the fifth embodiment are substantially the same as those of the third embodiment shown in FIG. 5.

Figure 7:
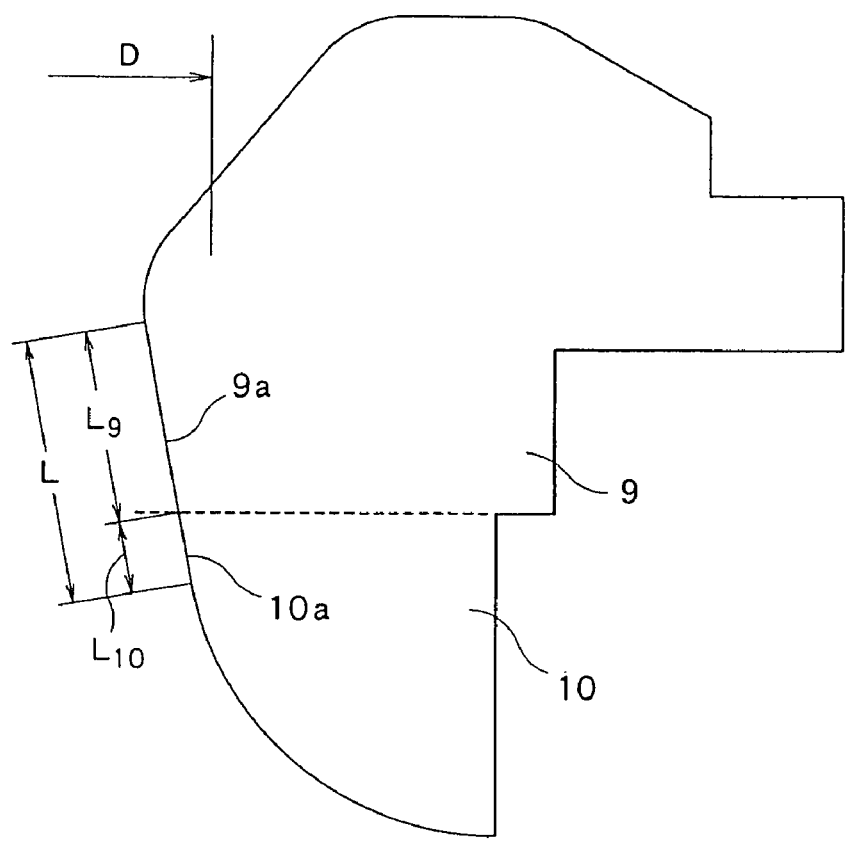
FIG. 7 is a longitudinal sectional view of a valve seat and an expansion part of a steam valve in a fifth embodiment of the present invention.

As shown in FIG. 7, the length $L_9$ of the flat surface 9a of the valve seat 9 in the up and down direction means a length of the flat surface 9a which is measured along the flat surface 9a of the valve seat 9 in the up and down direction. The length $L_{10}$ of the flat surface 10a of the expansion part 10 in the up and down direction is a length of the flat surface 10a which is measured along the flat surface 10a of the expansion part 10 in the up and down direction.

Figure 8:
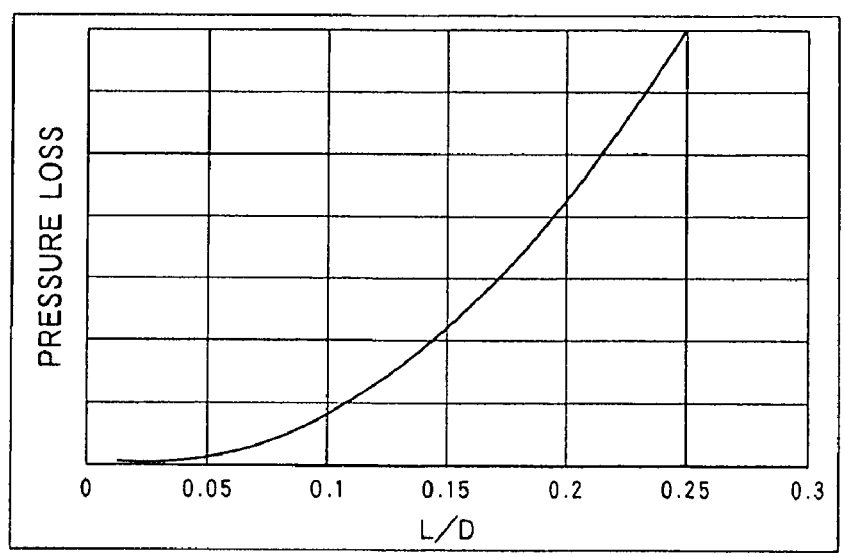
FIG. 8 is a graph showing a relationship between L/D and a pressure loss in the steam valve in the fifth embodiment of the present invention.

In the fifth embodiment shown in FIGS. 7 and 8, the same parts as those of the third embodiment shown in FIG. 5 are indicated by the same reference numbers, and a detailed description thereof is omitted.

An effect produced by the parameter L/D on a pressure loss had been examined by a numerical analysis, and a result shown in FIG. 8 was obtained. In FIG. 8, the axis of abscissa shows the L/D, and the axis of ordinate shows the pressure loss. According to this embodiment, as understood from FIG. 8, occurrence of pressure loss can be more reliably restrained by adjusting the parameter L/D such that the condition $0<L/D\leqq0.25$ is satisfied.

Sixth Embodiment

A sixth embodiment of the present invention is described with reference to FIGS. 9 and 10. In the sixth embodiment shown in FIGS. 9 and 10, an expansion part 10 has a curved surface 10r having an arcuate shape in the longitudinal cross section. When a radius of the arc of the curved surface 10r is R, and a nominal diameter of a reheat steam stop valve 25 is D, a condition $0<R/D\leqq0.25$ is satisfied. Other structures of the sixth embodiment are substantially the same as those of the third embodiment shown in FIG. 5.

Figure 9:
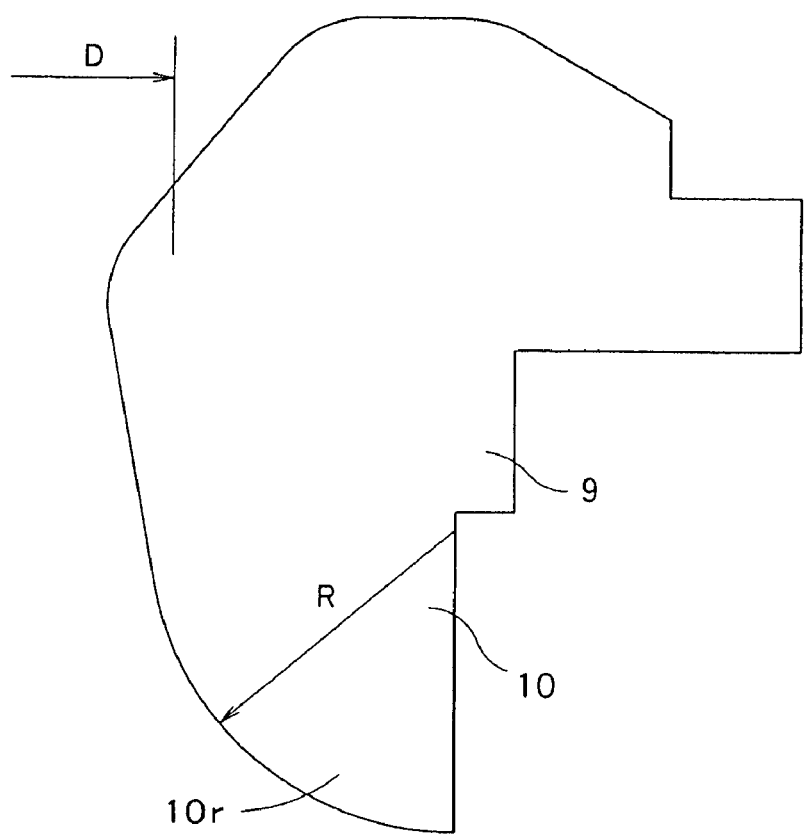
FIG. 9 is a longitudinal sectional view of a valve seat and an expansion part of a steam valve in a sixth embodiment of the present invention.
Figure 10:
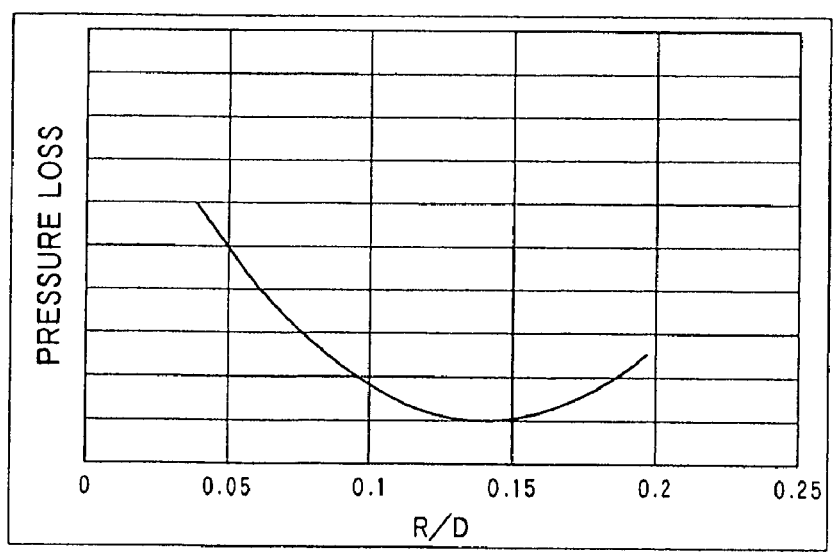
FIG. 10 is a graph showing a relationship between R/D and a pressure loss in the steam valve in the sixth embodiment of the present invention.

In the sixth embodiment shown in FIGS. 9 and 10, the same parts as those of the third embodiment shown in FIG. 5 and FIG. 7 are indicated by the same reference numbers, and a detailed description thereof is omitted.

An effect produced by the parameter R/D on a pressure loss had been examined by a numerical analysis, and a result shown in FIG. 10 was obtained. In FIG. 10, the axis of abscissa shows the R/D and the axis of ordinate shows the pressure loss. According to this embodiment, as understood from FIG. 10, occurrence of pressure loss can be more reliably restrained by adjusting the parameter R/D such that the condition $0<R/D\leqq0.25$ is satisfied.

Seventh Embodiment

A seventh embodiment of the present invention is described with reference to FIGS. 11 and 12. In the seventh embodiment shown in FIGS. 11 and 12, a valve seat 9 has a flat surface 9a on a position that is more downstream than a contact surface between the valve seat 9 and a valve body in a steam flow path, and an expansion part 10 has a flat surface 10a that is continuous from the flat surface 9a of the valve seat 9 on a side of the steam flow path. In the longitudinal cross section, the flat surface 9a of the valve seat 9 and the flat surface 10a of the expansion part 10 are inclined at an inclination angle θ with respect to an up and down direction (a predetermined direction directed from one side toward the other side). The inclination angle θ satisfies a condition $0°<\theta\leqq60°$. Other structures of the seventh embodiment are substantially the same as those of the third embodiment shown in FIG. 5.

Figure 11:
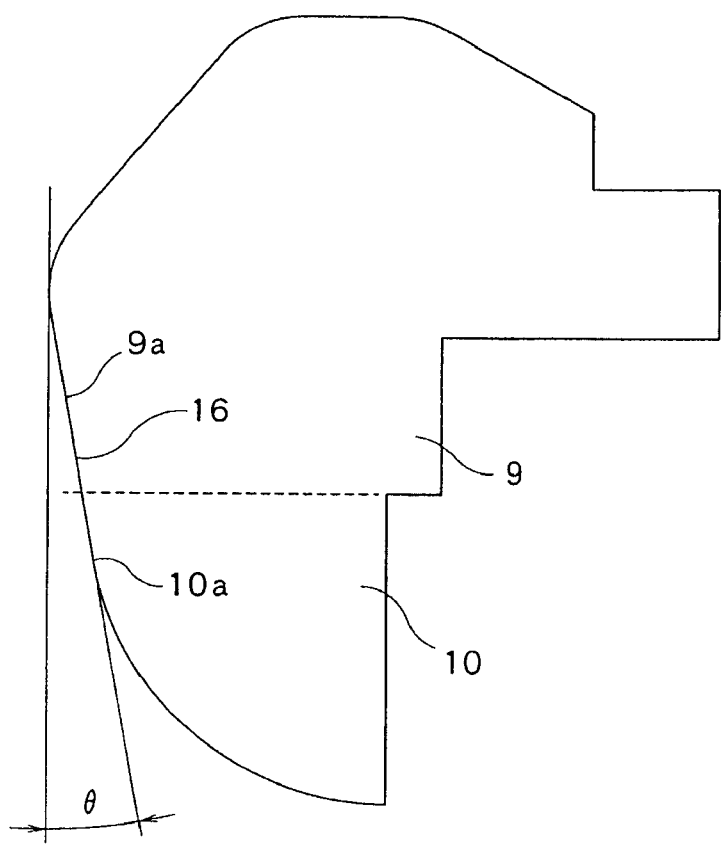
FIG. 11 is a longitudinal sectional view of a valve seat and an expansion part of a steam valve in a seventh embodiment of the present invention.
Figure 12:
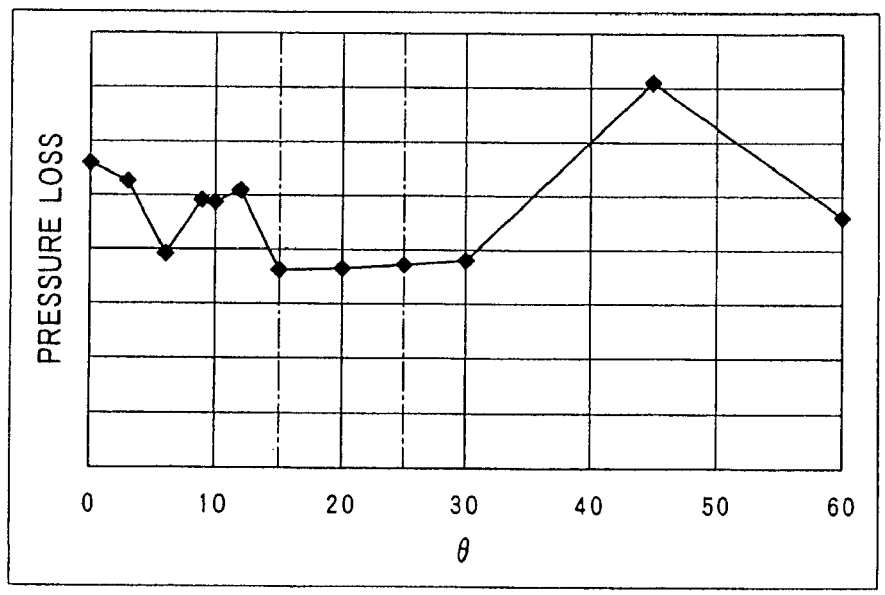
FIG. 12 is a graph showing a relationship between θ and a pressure loss in the steam valve in the seventh embodiment of the present invention.

In the seventh embodiment shown in FIGS. 11 and 12, the same parts as those of the third embodiment shown in FIG. 5 and FIG. 7 are indicated by the same reference numbers, and a detailed description thereof is omitted.

An effect produced by the parameter θ on a pressure loss had been examined by a numerical analysis, and a result shown in FIG. 12 was obtained. In FIG. 12, the axis of abscissa shows the θ and the axis of ordinate shows the pressure loss. According to this embodiment, as understood from FIG. 12, occurrence of pressure loss can be more reliably restrained by adjusting the parameter θ such that the condition $0°<\theta\leqq60°$ is satisfied.

Eighth Embodiment

Figure 13:
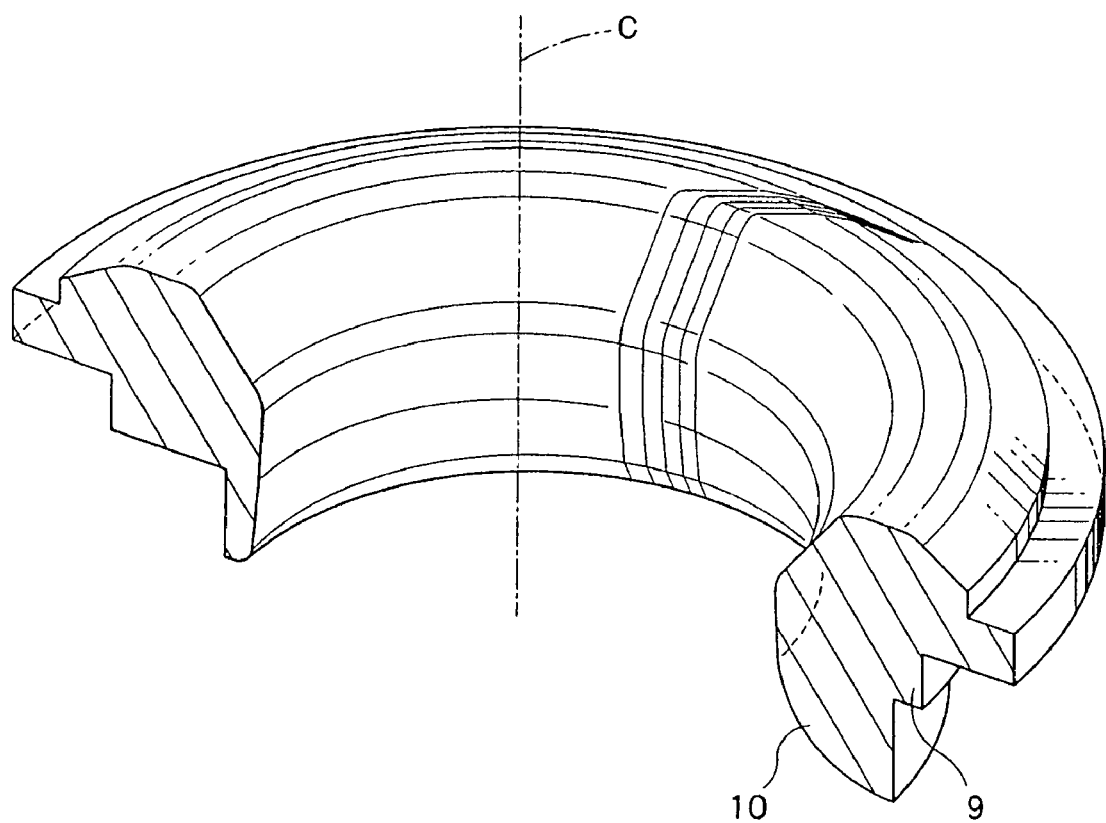
FIG. 13 is a perspective view of a steam valve in an eighth embodiment of the present invention.
Figure 14:
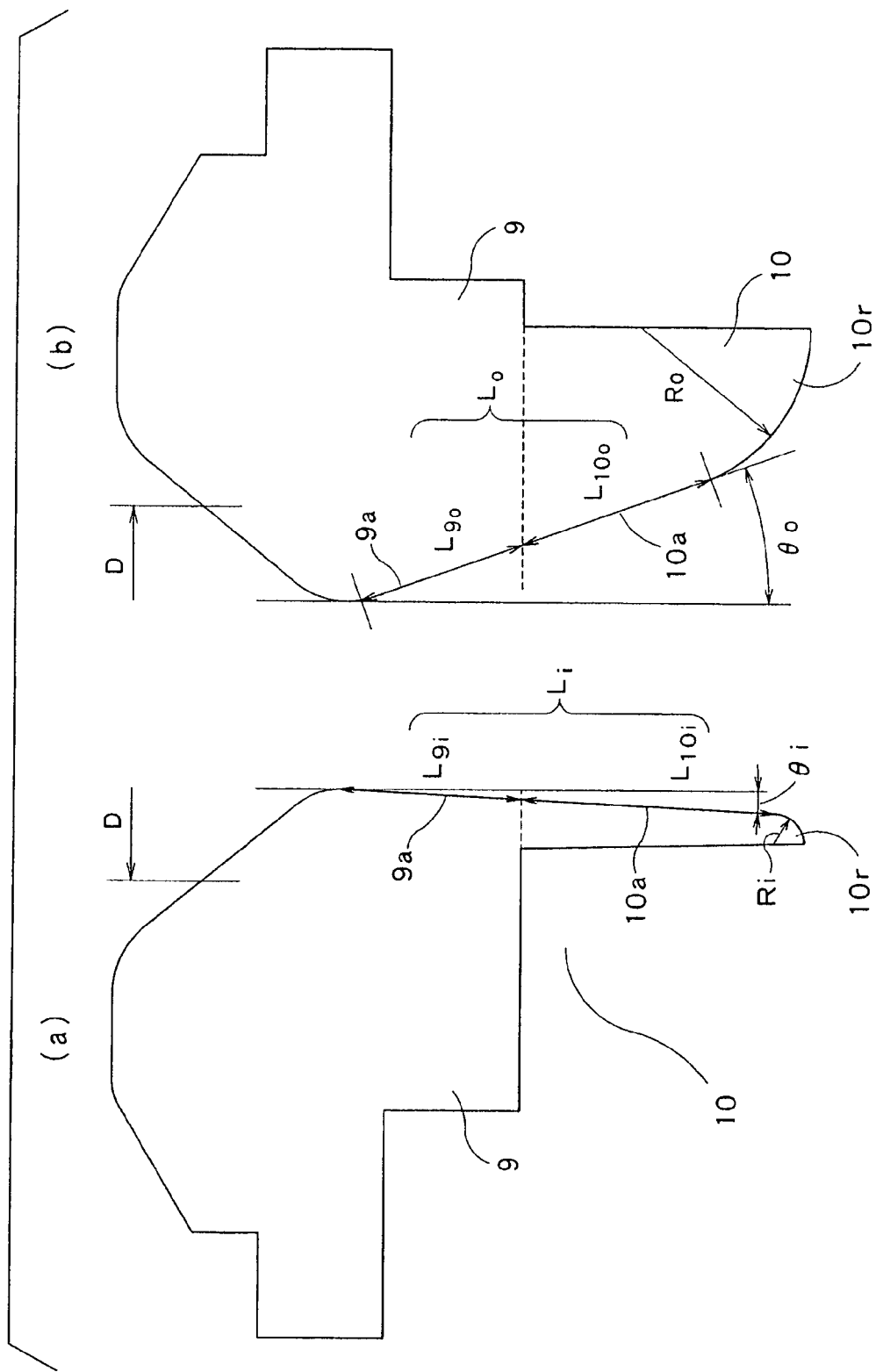
FIG. 14 is a longitudinal sectional view of a valve seat and an expansion part of a steam valve in the eighth embodiment of the present invention.
Figure 15:
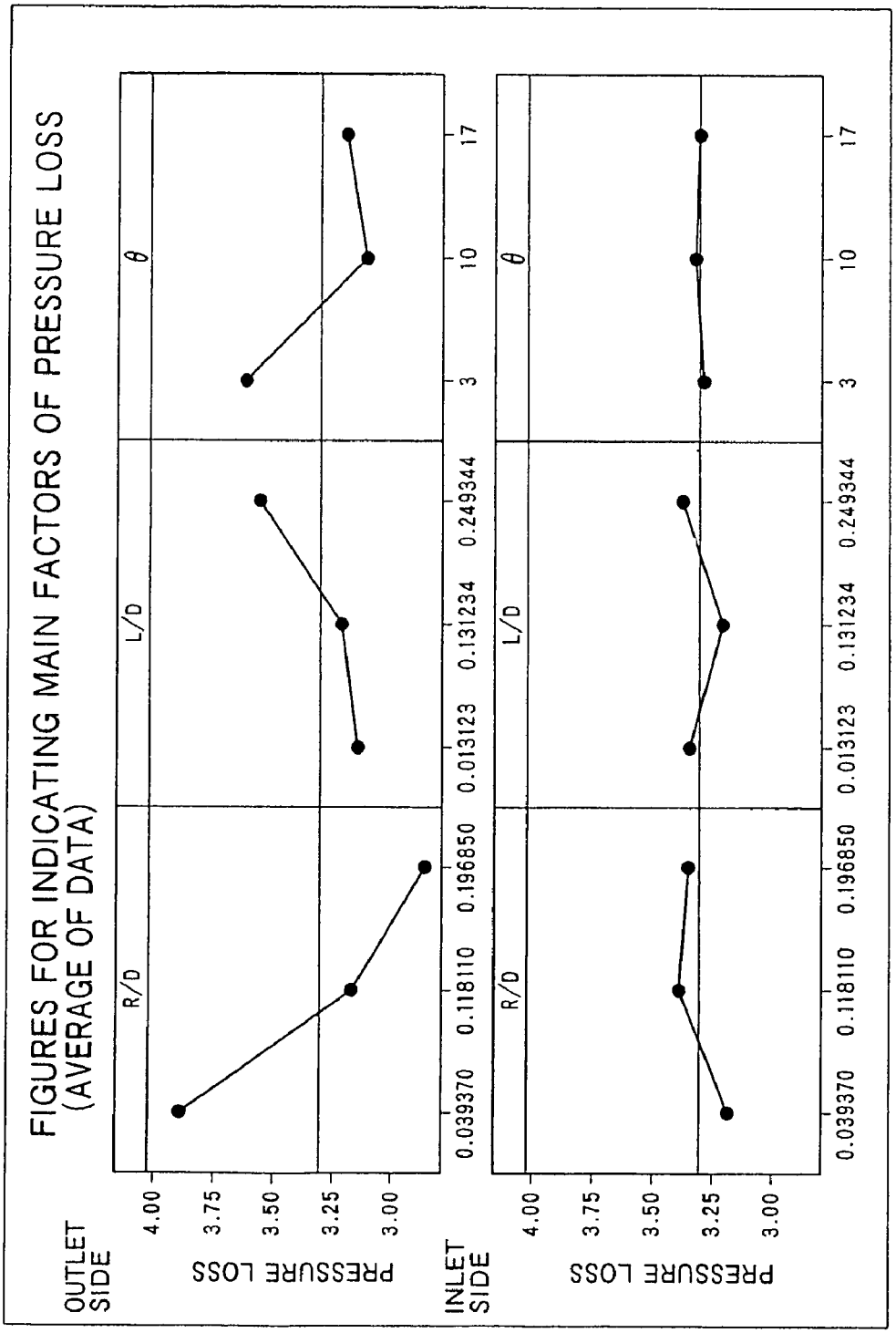
FIG. 15 is a graph showing a relationship between R/D, L/D, and θ, and a pressure loss in the steam valve in the eighth embodiment of the present invention.
Figure 16:
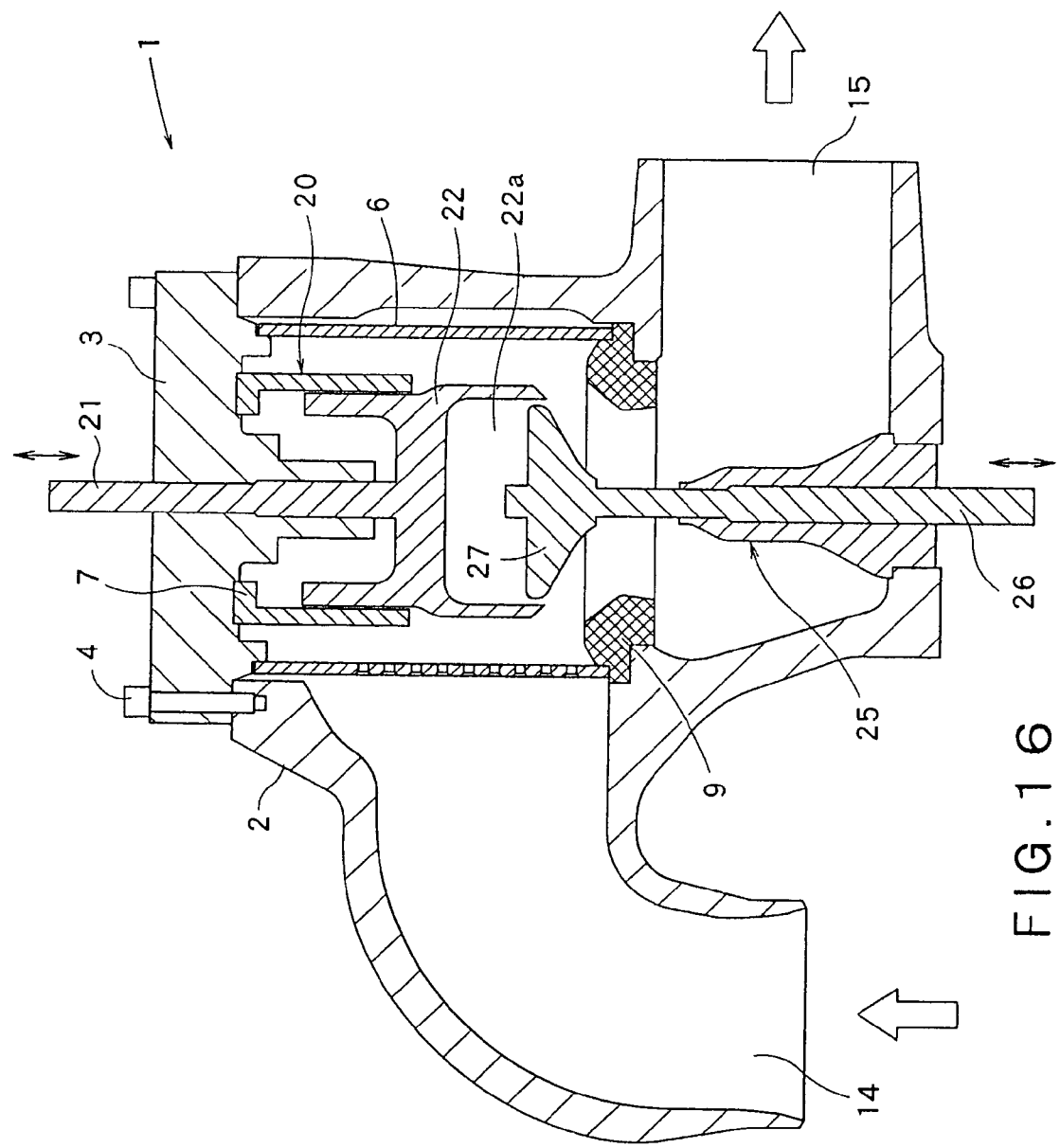
FIG. 16 is a longitudinal sectional view of a conventional steam valve.
Figure 17:
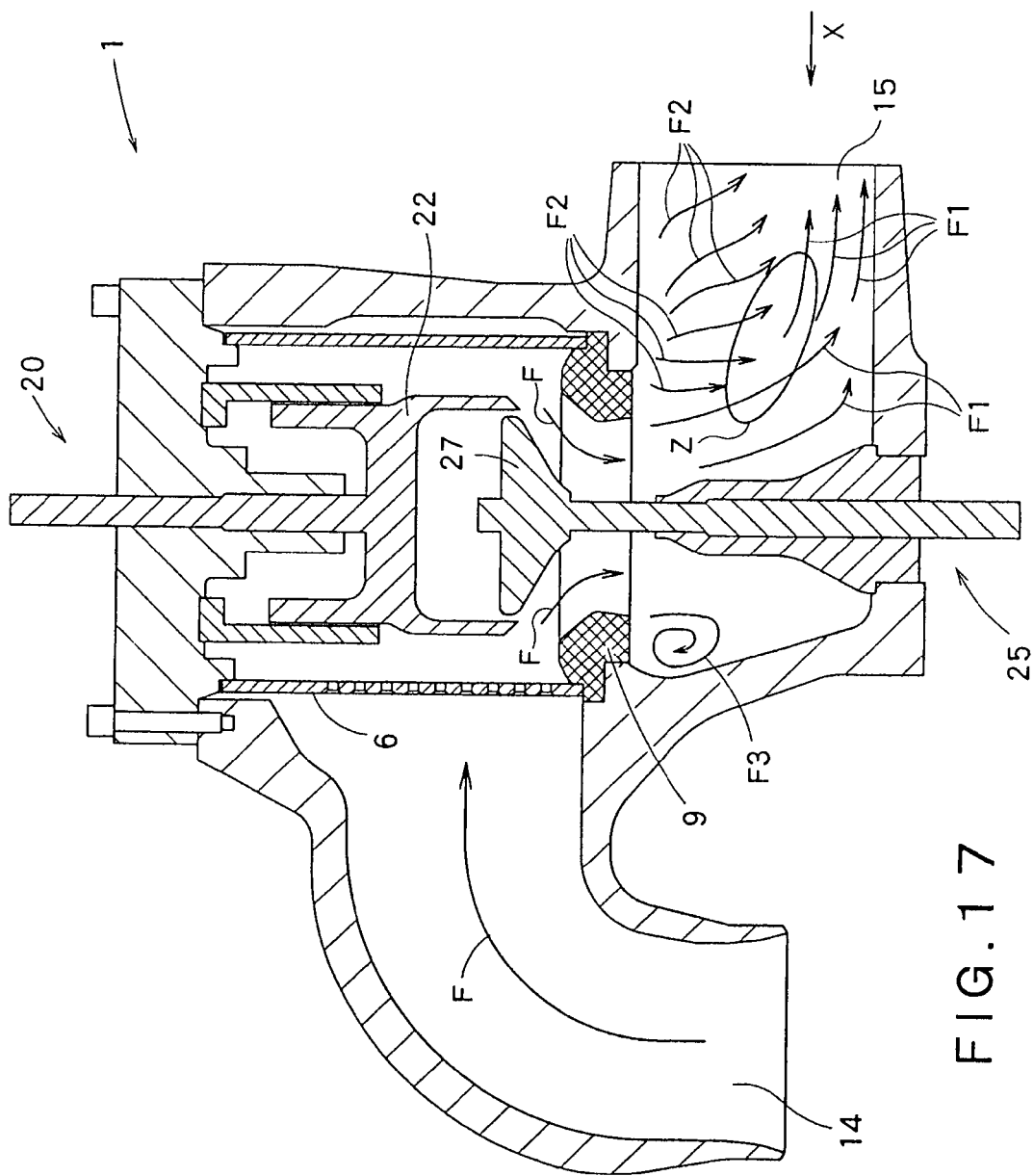
FIG. 17 is a longitudinal sectional view of a flow of a steam in the conventional steam valve.
Figure 18:
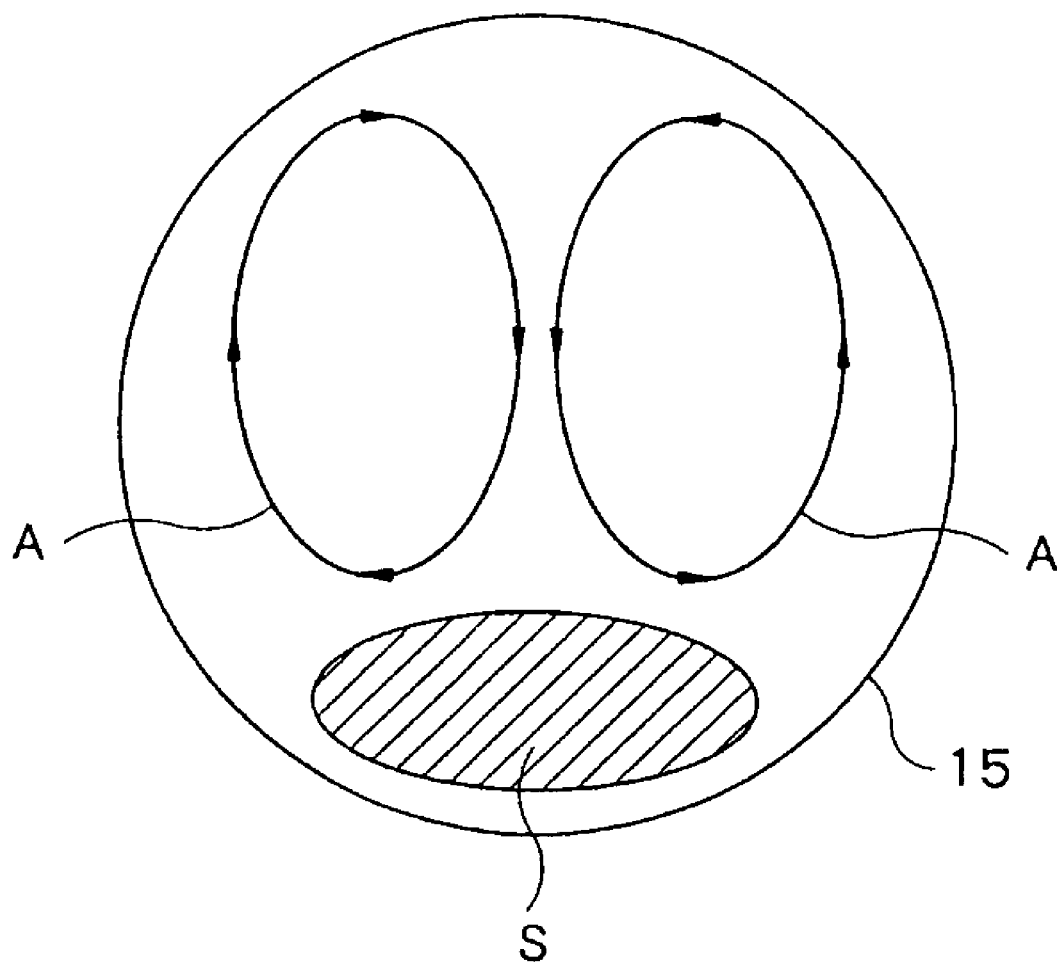
FIG. 18 is a view of the flow of the steam when viewed in a direction of the arrow X in FIG. 17.

Next, an eighth embodiment of the present invention is described with reference to FIGS. 13 to 15. In the eighth embodiment shown in FIGS. 13 to 15, a valve seat 9 has a flat surface 9a on a position that is more downstream than a contact surface between the valve seat 9 and the valve bodies 22, 27 in a steam flow path, while an expansion part 10 has a flat surface 10a that is continuous from the flat surface 9a of the valve seat 9 on a side of the steam flow path, and a curved surface 10r having an arcuate shape in the longitudinal cross section. In addition, shapes of the valve seat 9 and the expansion part 10 are non-symmetric about a central axis C (see, FIG. 13) extending through a center of the valve seat 9 in an up and down direction. Other structures of the eighth embodiment are substantially the same as those of the third embodiment shown in FIG. 5.

As shown in FIG. 14(a), at an end on a steam inlet side (a left end distal from the steam outlet pipe 15 when viewed from axial center lines of the valve rods 21 and 26 in FIG. 2), the flat surface 9a of the valve seat 9 and the flat surface 10a of the expansion part 10 are inclined at an inclination angle $\theta_i$ with respect to the up and down direction, in the longitudinal cross section. On the other hand, as shown in FIG. 14(b), at an end on a steam outlet side (an end proximal to the steam outlet pipe 15 when viewed from the axial center lines of the valve rods 21 and 26 in FIG. 2), the flat surface 9a of the valve seat 9 and the flat surface 10a of the expansion part 10 are inclined at an inclination angle $\theta_O$ with respect to the up and down direction, in the longitudinal cross section.

As shown in FIG. 14(a), at the end on the steam inlet side, a sum of a length $L_{9i}$ of the flat surface 9a of the valve seat 9 in the up and down direction and a length $L_{10i}$ of the flat surface 10a of the expansion part 10 in the up and down direction is $L_i$. On the other hand, as shown in FIG. 14(b), at the end on the steam outlet side, a sum of a length $L_{9O}$ of the flat surface 9a of the valve seat 9 in the up and down direction and a length $L_{10O}$ of the flat surface 10a of the expansion part 10 in the up and down direction is $L_O$.

As shown in FIG. 14(a), at the end on the steam inlet side, a radius of the arc of the curved surface 10r of the expansion part 10 is $R_i$. As shown in FIG. 14(b), at the end of the steam outlet side, a radius of the arc of the curved surface 10r of the expansion part 10 is $R_O$. A nominal diameter of the reheat steam stop valve 25 is D.

As described above, the shapes of the valve seat 9 and the expansion part 10 are non-symmetric with respect to the central axis extending through the center of the valve seat 9 in the up and down direction. In addition, the values of $L_i/D$ and $L_O/D$, the values of $R_i/D$ and $R_O/D$, and the values of $\theta_i$, and $\theta_O$ are different from each other.

More specifically, an effect produced by various combinations of the parameters on a pressure loss had been examined by fully using a numerical analysis. Based on a result thereof (see, FIG. 15), this embodiment is designed such that, at the end on the steam inlet side, following conditions $L_i/D=0.131$, $R_i/D=0.039$, and $\theta_i=3°$ are satisfied, while at the end on the steam outlet side, following conditions $L_O/D=0.013$, $R_O/D=0.197$, and $\theta_O=17°$ are satisfied. Therefore, according to this embodiment, occurrence of pressure loss can be restrained at a significantly low level.

In the aforementioned first to eighth embodiments, the combination reheat steam valve is mainly described as a steam valve. However, not limited thereto, the present invention can be similarly applied to a main-steam stop valve.

The invention claimed is:
1. A steam valve comprising:
a valve seat being accommodated in a steam flow path of a casing provided with a steam inlet pipe and a steam outlet pipe;
a valve body configured to contact the valve seat, the valve body being accommodated in the steam flow path of the casing;
a valve rod coupled with the valve body; and
an expansion part that smoothly projects from the valve seat toward the steam outlet pipe, disposed at a downstream side on a contact surface of the valve seat,
wherein the expansion part is asymmetrically disposed, mainly at a side of the steam outlet pipe, when seen in a direction of the valve rod.

2. The steam valve according to claim 1, wherein
the valve body includes a control valve that is driven from one side and is configured to contact the valve seat, and a stop valve on the other side of the control valve, the stop valve being driven from the other side and configured to contact the valve seat.

3. The steam valve according to claim 1, wherein:
the expansion part curvilinearly projects from the valve seat so as to form a hollow part between the expansion part and the valve seat; and
a reinforcement rib that fixes the expansion part to the valve seat for reinforcement is disposed in the hollow part between the expansion part and the valve seat.

4. The steam valve according to claim 1, wherein
the expansion part extends from the valve seat toward the steam outlet pipe without forming a gap.

5. The steam valve according to claim 1, wherein
the expansion part is separate from the valve seat, and the expansion part is attachable to and detachable from the valve seat.

6. The steam valve according to claim 1, wherein:
the valve seat includes a flat surface on a side of the steam flow path;
the expansion part includes a flat surface that is continuous from the flat surface of the valve seat on the side of the steam flow path; and
when a sum of a length of the flat surface of the valve seat in a predetermined direction directed from one side to the other side and a length of the flat surface of the expansion part in the predetermined direction is L, and a radius of the contact surface that is defined when the valve body is in contact with the valve seat is D, a condition $0<L/D\leq 0.25$ is satisfied.

7. The steam valve according to claim 1, wherein:
the expansion part includes a curved surface including an arcuate shape in the longitudinal cross section;
when a radius of an arc of the curved surface is R, and a radius of a contact surface that is defined when the valve body is in contact with the valve seat is D, a condition $0<R/D\leq 0.25$ is satisfied.

8. The steam valve according to claim 1, wherein
the valve seat includes a flat surface on a side of the steam flow path;
the expansion part includes a flat surface that is continuous from the flat surface of the valve seat on the side of the steam flow path;
the flat surface of the valve seat and the flat surface of the expansion part are inclined at an inclination angle $\theta$ with respect to a predetermined direction directed from one side to the other side in the longitudinal cross section; and
the inclination angle $\theta$ satisfies a condition $0°<\theta\leq 60°$.

9. The steam valve according to claim 1, wherein
the valve seat includes a flat surface on a side of the steam flow path;
the expansion part includes a flat surface that is continuous from the flat surface of the valve seat on the side of the steam flow path, and a curved surface that is continuous from the flat surface of the expansion part, the curved surface including an arcuate shape in the longitudinal cross section;

the flat surface of the valve seat and the flat surface of the expansion part are inclined at an inclination angle θ with respect to a predetermined direction directed from one side to the other side in the longitudinal cross section; and when a sum of a length of the flat surface of the valve seat in the predetermined direction and a length of the flat surface of the expansion part in the predetermined direction is L, a radius of the contact surface that is defined when the valve body is in contact with the valve seat is D, and a radius of the arc of the curved surface of the expansion part is R, each value of L/D, R/D, and θ is different at least between at an end of a steam outlet side and at an end of a steam inlet side.

10. A generator set comprising:
a steam valve including:
- a valve seat being accommodated in a steam flow path of a casing provided with a steam inlet pipe and a steam outlet pipe;
- a valve body configured to contact the valve seat, the valve body being accommodated in the steam flow path of the casing;
- a valve rod coupled with the valve body; and an expansion part that smoothly projects from the valve seat toward the steam outlet pipe, disposed at a downstream side on a contact surface of the valve seat,
wherein the expansion part is asymmetrically disposed, mainly at a side of the steam outlet pipe, when seen in a direction of the valve rod.

11. A generator set comprising:
a boiler configured to generate steam;
a steam valve to which the steam from the boiler is introduced through a steam inlet pipe; and
a steam turbine to which the steam having passed through the steam valve is introduced through a steam outlet pipe, the steam turbine being configured to generate an electric power by using the steam;
wherein:
the steam valve comprises:
- a control valve being accommodated in a casing, the control valve is driven from one side and is configured to contact a valve seat;
- a stop valve being accommodated in the casing and disposed on the other side of the control valve, the stop valve being driven from the other side and configured to contact the valve seat; and an expansion part that smoothly projects from the valve seat toward the steam outlet pipe of the casing, disposed at a downstream side on a contact surface of the valve seat,
wherein the expansion part is asymmetrically disposed, mainly at a side of the steam outlet pipe, when seen in a direction of a valve rod.

\* \* \* \* \*